(12) United States Patent
Kuchinsky et al.

(10) Patent No.: US 10,520,660 B2
(45) Date of Patent: Dec. 31, 2019

(54) SPATIAL MULTIPLEXING COUPLER FOR LIGHT GUIDE PLATES

(71) Applicant: CORNING INCORPORATED, Corning, NY (US)

(72) Inventors: Sergey Anatol'evich Kuchinsky, St. Petersburg (RU); Shenping Li, Painted Post, NY (US); Aramais Robert Zakharian, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/766,663

(22) PCT Filed: Oct. 5, 2016

(86) PCT No.: PCT/US2016/055479
§ 371 (c)(1),
(2) Date: Apr. 6, 2018

(87) PCT Pub. No.: WO2017/062442
PCT Pub. Date: Apr. 13, 2017

(65) Prior Publication Data
US 2018/0313996 A1 Nov. 1, 2018

Related U.S. Application Data

(60) Provisional application No. 62/237,761, filed on Oct. 6, 2015.

(51) Int. Cl.
*G02B 6/00* (2006.01)
*F21V 8/00* (2006.01)

(52) U.S. Cl.
CPC ......... *G02B 6/0028* (2013.01); *G02B 6/0023* (2013.01); *G02B 6/0065* (2013.01)

(58) Field of Classification Search
None
See application file for complete search history.

(56) References Cited

U.S. PATENT DOCUMENTS 4,824,194 A 4/1989 Karasawa
5,268,978 A * 12/1993 Po .................. G02B 6/2804
372/6

(Continued)

FOREIGN PATENT DOCUMENTS

CN 103899973 A 7/2014
CN 104181630 A 12/2014
(Continued)

OTHER PUBLICATIONS

Chang et al; Reflective-Recycling Coupling Device for Ultra-Thin Light Guide Plate (LGP); IDW '07; Proceedings of the 14th International Display Workshops vol. 2, (Dec. 6, 2007); 4 Pages.
(Continued)

*Primary Examiner* — Michael Stahl
(74) *Attorney, Agent, or Firm* — Ryan T. Hardee

(57) ABSTRACT

A light guide plate suitable for use in a liquid crystal display device, the light guide plate comprising a glass plate and a light coupler bonded to a edge surface of the light guide plate. Also disclosed is a backlight unit for a liquid crystal display device employing the light guide plate, and a display device employing the backlight unit.

18 Claims, 7 Drawing Sheets

(56) References Cited

U.S. PATENT DOCUMENTS

| | | | |
|---|---|---|---|
| 5,581,380 A * | 12/1996 | Bergman | G02F 1/1334 349/110 |
| 6,470,125 B1 * | 10/2002 | Nashimoto | G02F 1/0353 385/122 |
| 8,714,781 B2 | 5/2014 | Nichol | |
| 8,840,292 B2 | 9/2014 | Hu et al. | |
| 8,974,104 B2 | 3/2015 | Chang et al. | |
| 8,994,895 B2 | 3/2015 | Huang | |
| 9,007,546 B2 | 4/2015 | Seo et al. | |
| 9,063,255 B2 | 6/2015 | Wu et al. | |
| 9,091,796 B2 | 7/2015 | Wang He | |
| 2003/0095417 A1 | 5/2003 | Keuper et al. | |
| 2007/0086712 A1 | 4/2007 | Shani | |
| 2008/0101084 A1 * | 5/2008 | Hsu | G02B 6/0023 362/612 |
| 2008/0175023 A1 * | 7/2008 | Lee | G02B 6/0068 362/613 |
| 2008/0177257 A1 * | 7/2008 | Smith | G02B 6/0008 606/15 |
| 2011/0032450 A1 | 2/2011 | Shigeta et al. | |
| 2011/0228559 A1 * | 9/2011 | Kinder | G02B 6/0028 362/608 |
| 2011/0267841 A1 * | 11/2011 | Lee | G02B 6/003 362/613 |
| 2013/0208214 A1 | 8/2013 | Huang et al. | |
| 2013/0235611 A1 * | 9/2013 | Franklin | G09F 13/04 362/602 |
| 2013/0258708 A1 | 10/2013 | Huang | |
| 2015/0185394 A1 | 7/2015 | Huang et al. | |
| 2015/0198757 A1 * | 7/2015 | Comstock, II | G02B 6/0028 362/610 |
| 2016/0062173 A1 * | 3/2016 | Hsiao | G02F 1/133308 349/58 |
| 2016/0306095 A1 * | 10/2016 | Hu | G02B 6/0023 |
| 2017/0261675 A1 * | 9/2017 | Dannoux | G02B 6/0065 |
| 2018/0066814 A1 * | 3/2018 | Arai | C03C 3/087 |
| 2018/0208500 A1 * | 7/2018 | Lee | C03C 3/083 |

FOREIGN PATENT DOCUMENTS

| | | |
|---|---|---|
| CN | 104793282 B | 2/2018 |
| WO | 2017027676 A1 | 2/2017 |

OTHER PUBLICATIONS

Chu et al; "Novel High Brightness LED Backlight Design and Optimization"; ADEAC 06, pp. 170-173.

International Search Report and Written Opinion of the International Searching Authority; PCT/US20168/055479; dated Dec. 13, 2016; 12 Pages; European Patent Office.

Shenping; "Edge Lighted Backlight Unit for Liquid Crystal Display Device" Filed as U.S. Appl. No. 62/151,508 on Apr. 23, 2015; 33 Pages.

* cited by examiner

Parameters to optimize:
R and α

$L = 2R \sin(\alpha)$

SPATIAL MULTIPLEXING COUPLER FOR LIGHT GUIDE PLATES

CROSS-REFERENCE TO RELATED APPLICATIONS

This application claims the benefit of priority under 35 U.S.C. § 371 of International Patent Application Serial No. PCT/US16/055479, filed on Oct. 5, 2016, which in turn, claims the benefit of priority of U.S. Provisional Patent Application Ser. No. 62/237,761 filed on Oct. 6, 2015, the contents of each of which are relied upon and incorporated herein by reference in their entireties.

FIELD

The present disclosure is generally directed to an edge lighted backlight unit for a liquid crystal display device, and more particularly a backlight unit comprising a coupler configured to couple light between an array of light sources and a light guide plate comprising the backlight unit.

BACKGROUND

Liquid crystal display (LCD) panels typically comprise two pieces of thin glass (color filter substrate and TFT substrate) including a liquid crystal material disposed therebetween, a polymer light guide (e.g. Poly(methyl methacrylate)—PMMA) and a few thin plastic films (diffusers, DBEF films, etc.). Due to the poor elastic modulus of PMMA, the overall structure may have insufficient rigidity to withstand significant physical shock. Consequently, additional mechanical structure may be needed to provide stiffness. Young's modulus for PMMA is about 2 gigaPascal (GPa) for PMMA. In contrast, most silica-based glasses have a young's modulus of about 72 GPa.

Humidity testing shows that PMMA is extremely sensitive to moisture, and dimensions can change by about 0.5%. On a length of about a meter, that means about 5 mm of dimension increase, which is very significant and makes mechanical design of a backlight unit challenging. Typically, an air gap is provided between the light source (e.g. light emitting diodes—LEDs) and the PMMA light guide to accommodate expansion of the PMMA. Unfortunately, light coupling between the light source and the PMMA light guide is sensitive to the distance between the light source and the light guide, which can cause the display brightness to change as a function of humidity.

PMMA has a coefficient of thermal expansion (CTE) of approximately $75 \times 10^{-6}$/° C. and has relatively low thermal conductivity of about 0.2 W/m/K, while the same attributes for temperature of about 105° C. The low thermal conductivity of the PMMA impedes heat dissipation from the material. Thus, as the light guide approaches close to the LED's, which can dissipate a lot of energy, the PMMA can become very hot.

Due to the poor thermal, mechanical and dimensional stability of PMMA, a glass, such as a silica-based glass, is considered a potential replacement solution for PMMA in liquid crystal display (LCD) backlight units. However, since high quality optical-grade glass can be more expensive to produce than PMMA, the cost of the glass drives technology development toward thinner light guides, while the size of the LED's that must couple to the light guide, for example at least 2 millimeters thick, require the glass to be thicker than traditional 0.07 millimeter (mm) thick LCD glass to enable close to 100% coupling of light from the LEDs into the light guide.

SUMMARY

In some embodiments, an optical coupling device is provided which enables efficient coupling of light from a light source to a thin light guide plate. This optical coupling device consists of a multiple layers of waveguides with bending in both vertical (lateral) and horizontal direction.

In some embodiments a backlight unit is provided comprising a glass light guide plate comprising a first major surface, a second major surface, and at least one edge surface having a thickness $Th_1$; a light coupler coupled to the light guide plate comprising an integer n number of waveguides bonded to portions of the edge surface; and a light source positioned adjacent an input facet of the light coupler, the input facet having a thickness $Th_2$.

In some embodiments, a backlight unit is provided comprising a glass light guide plate comprising a first major surface, a second major surface, and at least one edge surface having a thickness $Th_1$; a light coupler having an input facet coupled to the light guide plate comprising an integer n number of waveguides bonded to portions of the edge surface, each waveguide having an output facet; and a light source positioned adjacent the input facet of the light coupler, the input facet having a thickness $Th_2$.

In some embodiments, a light coupler is provided comprising an input facet; and an integer n number of waveguides, each waveguide having an output facet.

Additional features and advantages of the disclosure will be set forth in the detailed description which follows, and in part will be readily apparent to those skilled in the art from detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Various embodiments of the disclosure will now be discussed with reference to FIGS. 1-10, which illustrate exemplary methods and devices. The following general description is intended to provide an overview of the claimed methods and devices, and various aspects will be more specifically discussed throughout the disclosure with reference within the context of the disclosure.

Figure 1:
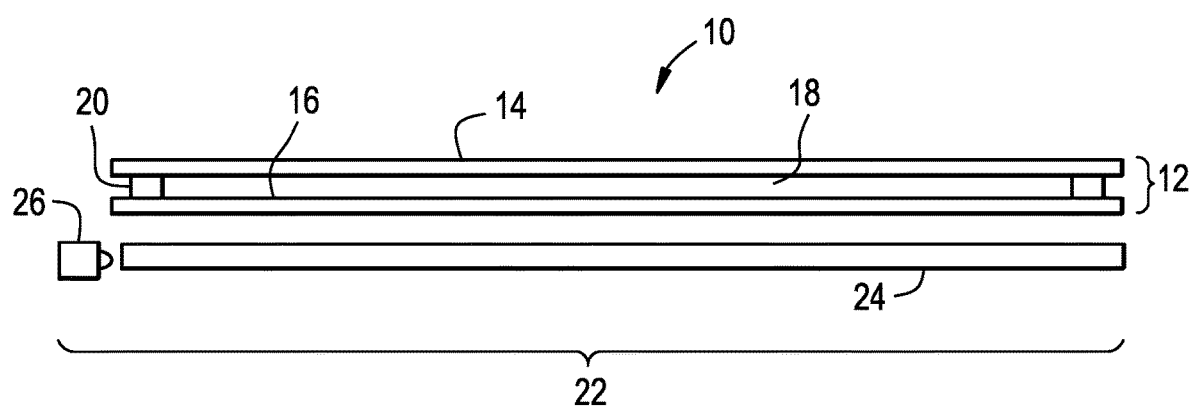
FIG. 1 is cross sectional side view of an exemplary liquid crystal display device showing the display panel and the backlight unit.

FIG. 1 is cross sectional side view of an exemplary liquid crystal display device 10 showing the display panel and the backlight unit. Components not essential to the current discussion have been omitted for clarity. The liquid crystal display device 10 comprises a liquid crystal display panel 12 comprising a top glass plate 14 (e.g., color filter), a bottom glass plate 16 (e.g., thin film transistor, TFT, backplane) and a liquid crystal material 18 disposed therebetween. Edge portions of the glass plates 14 and 16 can be sealed with a sealing material 20. The liquid crystal display device 10 can further comprise a backlight unit 22 comprising a light guide plate 24 and a light source 26. Modern liquid crystal display devices typically comprise a light source arranged along one or more edges of the light guide plate and configured to inject light into the light guide plate at the edge(s) thereof.

Figure 2:
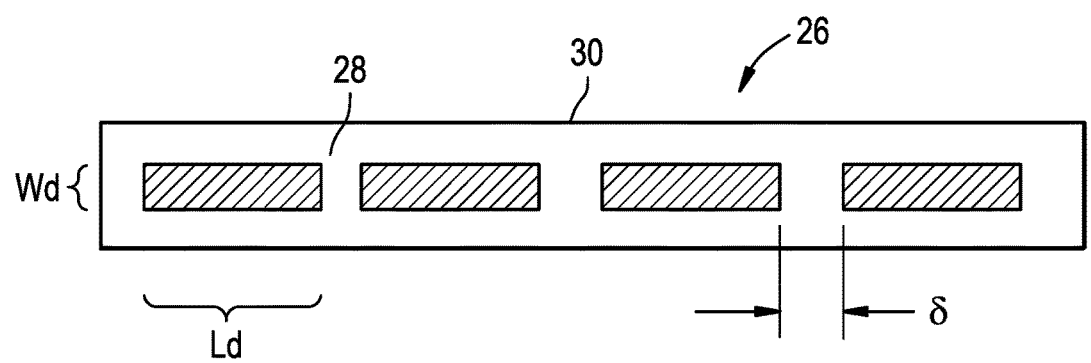
FIG. 2 is a top view of an example LED light source for use in the backlight unit of FIG. 1.

FIG. 2 is a top view of an exemplary LED light source for use in the backlight unit of FIG. 1. With reference to FIG. 2, a suitable light source 26 used as a light source for illuminating LCD displays may be formed as a linear array of discrete light emitting diodes (LEDs) 28 mounted on a strip-shaped circuit board 30. The individual LEDs can have a rectangular shape (for example, 7×2 millimeters, length Ld by width Wd, respectively) and the LEDs in the array are separated from their nearest neighbor LED by a gap $\delta$ of 2 to 5 millimeters. In other embodiments, the LEDs may be circular or any other shape and such a depiction should not limit the scope of the claims appended herewith. In further embodiments, another suitable light source 26 used as a light source for illuminating LCD displays may be a linear array of discrete light emitting devices which use quantum dots to broaden the color gamut of the light source 26.

Figure 3A:
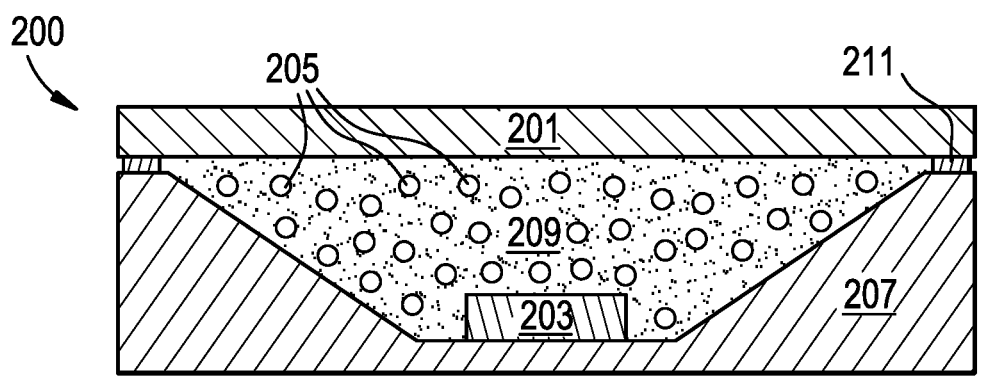
FIGS. 3A-C illustrate cross-sectional views of sealed devices according to certain embodiments of the disclosure.
Figure 3B:
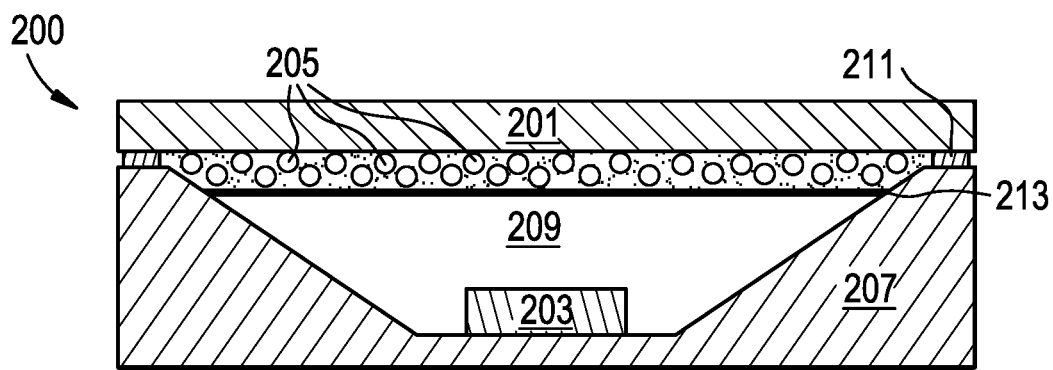

Cross-sectional views of two non-limiting embodiments of a light source comprising a sealed device having quantum dots are illustrated in FIGS. 3A-B. The sealed device 200 comprises a first glass substrate 201 and a second glass substrate 207 comprising at least one cavity 209. The at least one cavity 209 can contain at least one quantum dot 205. The at least one cavity 209 can also contain at least one LED component 203. The first substrate 207 and second substrate 201 can be joined together by at least one seal 211, which can extend around the at least one cavity 209. Alternatively, the seal can extend around more than one cavity, such as a group of two or more cavities (not shown). In additional embodiments, one or more lenses (not shown), may be provided on a side of the first glass substrate 201 opposite the LED 203. The LED 203 may be any size in diameter or in length, about 300 μm to about 800 μm, from about 400 μm to about 700 μm, from about 350 μm to about 400 μm and any sub-ranges therebetween. The LED 203 may also provide a high or low flux, for example, for high flux purposes the LED 203 may emit 20 W/cm$^2$ or more. For low flux purposes, the LED 203 may emit less than 20 W/cm$^2$.

In the non-limiting embodiment depicted in FIG. 3A, the at least one LED component 203 can be in direct contact with the at least one quantum dot 205. As used herein the term "contact" is intended to denote direct physical contact or interaction between two listed elements, e.g., the quantum dot and LED component are able to physically interact with one another within the cavity. In the non-limiting embodiment depicted in FIG. 3B, the at least one LED component 203 and the at least one quantum dot 205 may be present in the same cavity, but are separated, e.g., by a separation barrier or film 213.

Figure 3C:
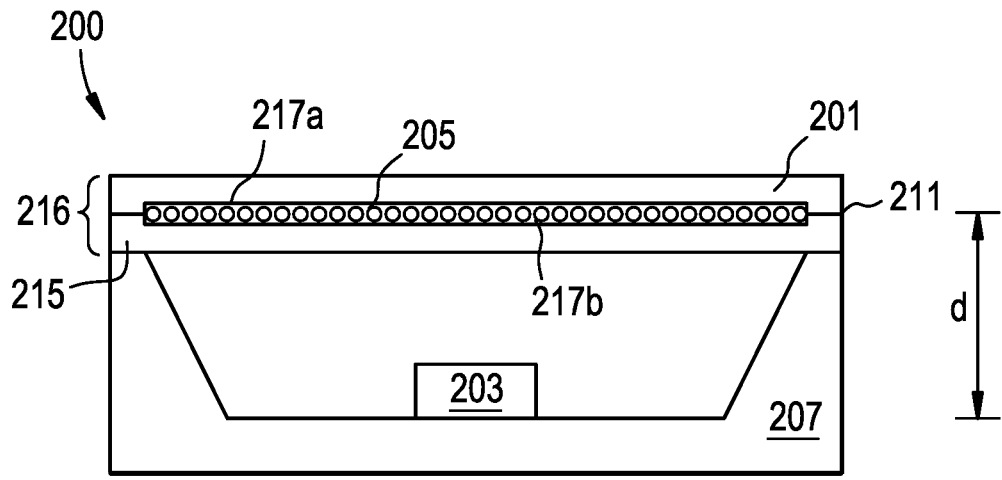

In the non-limiting embodiment depicted in FIG. 3C, a sealed device 200 may include at least one LED component 203, a first substrate 201, a second substrate 207, and a third substrate 215. The first substrate 201 and third substrate 215 may form an hermetically sealed package or device 216 which forms an enclosed and encapsulated region containing the at least one quantum dot 205. In some embodiments the hermetically sealed package or device 216 will also include one or more films 217a, b such as, but not limited to, films that act as high pass filters and films that act as low pass filters or films that are provided to filter predetermined wavelengths of light. In some embodiments, the at least one LED component 203 can be spaced apart from the at least one quantum dot 205 by a predetermined distance "d". In some embodiments the predetermined distance can be less than or equal to about 100 μm. In other embodiments, the predetermined distance is between about 50 μm and about 2 mm, between about 75 μm and about 500 μm, between about 90 μm and about 300 μm, and all subranges therebetween. In some embodiments, the predetermined distance is measured from a top surface of the LED component 203 to a midline of the enclosed and encapsulated region containing the at least one quantum dot 205. Of course, the predetermined distance may also be measured to any portion of the enclosed and encapsulated region containing the at least one quantum dot 205 such as but not limited to an upper surface of the third substrate 215 facing the at least one quantum dot 205, a lower surface of the first substrate 201 facing the at least one quantum dot 205, or a surface formed by any one of the films or filters 217a, b which may be present in the hermetically sealed package or device 216. In some embodiments, exemplary films include a filter 217a which prevents blue light from an exemplary LED component 203 from escaping the device 216 in one direction and/or another material) from escaping the device 216 in a second direction. For example, in some embodiments, the device 200 may comprise one or more LED components 203 contained in a well or other enclosure formed by the second substrate 207 and/or other substrates. An hermetically sealed package or device 216 in close proximity (e.g., a predetermined distance as discussed above) to the one or more LED components may be fixed to or sealed to the second substrate 207 and may comprise a first substrate 201 hermetically sealed to a third substrate 215 which forms an encapsulated region containing single wavelength quantum dot material 205 configured to emit light in a predetermined wavelength (e.g., infrared, near-infrared wavelength, or in a predetermined spectrum) when excited by light emitted from the one or more LED components 203. The quantum dot material 205 can be spaced apart from the LED component 203 by a predetermined distance. In such an exemplary embodiment, a first filter 217a may be provided on the bottom (or top) surface of the first substrate 201 to filter blue light from emitting though the top surface of the device 200 and a second filter 217b may be provided on the top (or bottom)

surface of the third substrate 215 to filter excited light from the quantum dot material from exiting the bottom surface of the third substrate 215.

The first substrate 201, second substrate 207 and/or third substrate 215 can, in some embodiments, be chosen from glass substrates and may comprise any glass known in the art for use in display and other electronic devices. Suitable glasses can include, but are not limited to, aluminosilicate, alkali-aluminosilicate, borosilicate, alkali-borosilicate, aluminoborosilicate, alkali-aluminoborosilicate, and other suitable glasses. These substrates may, in various embodiments, be chemically strengthened and/or thermally tempered. Non-limiting examples of suitable commercially available substrates include EAGLE XG®, Lotus™, Iris™, Willow®, and Gorilla® glasses from Corning Incorporated, to name a few. Glasses that have been chemically strengthened by ion exchange may be suitable as substrates according to some non-limiting embodiments. Other exemplary, non-limiting light sources 26 are described in U.S. Application No. 62/214,548, filed Sep. 4, 2015, the entirety of which is incorporated herein by reference.

As previously stated, when considering glass as a replacement for PMMA, the material and manufacturing costs of the glass can have a significant impact on the overall cost of a backlight unit. Thus, from a pure cost basis, thinner glass is desirable. On the other hand, the relatively large size of individual LEDs used to illuminate LCD panel 12 compared of light from the LED into the glass light guide plate.

Figure 4:
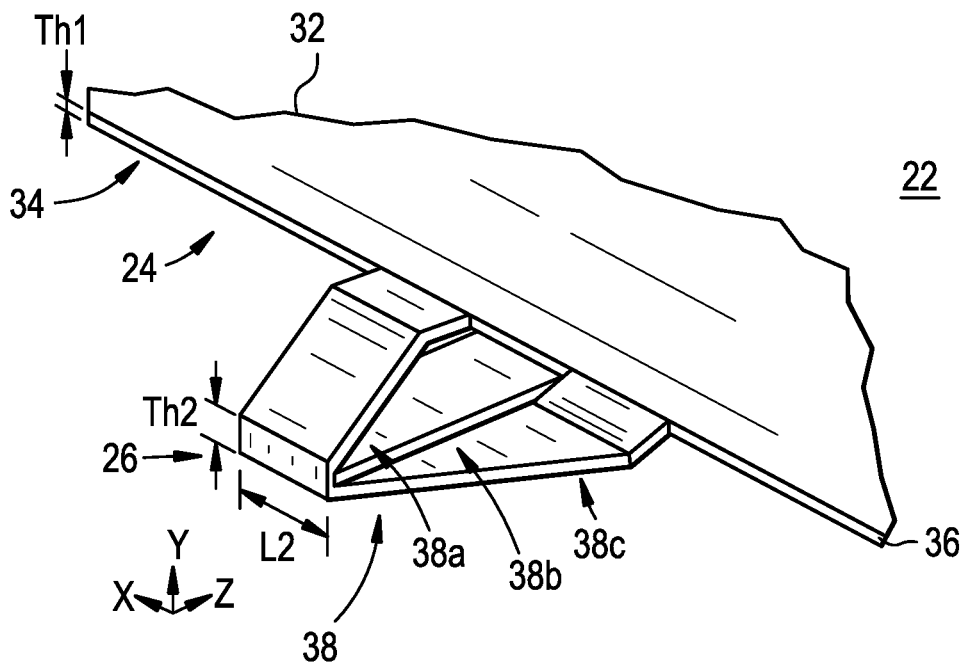
FIG. 4 is a perspective view of some embodiments of the present subject matter.
Figure 5:
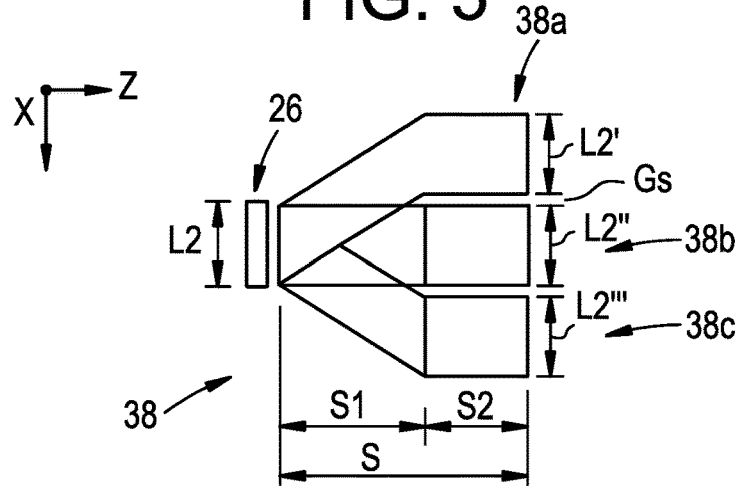
FIG. 5 is a top plan view of the coupler depicted in FIG. 4.

FIG. 4 is a perspective view of some embodiments of the present subject matter. FIG. 5 is a top plan view of the coupler depicted in FIG. 4. With reference to FIGS. 4 and 5, a backlight unit 22 according to some embodiments comprises a glass light guide plate 24 including a first major surface 32 and a second major surface 34 opposite the first major surface 32. The light guide plate 24 further comprises at least one edge surface 36 extending between the first major surface 32 and second major surface 34. A thickness $Th_1$ of the light guide plate 24 between first and second major surfaces may be in a range from about 0.1 millimeters to about 3 millimeters, from about 0.3 mm to about 1 mm, for example equal to or greater than 0.7 millimeters, equal to or greater than 1 millimeters, equal to or greater than 1.5 millimeters, or equal to or greater than 2 millimeters and all ranges and subranges therebetween. In some embodiments, $Th_1$ of the light guide plate 24 may be equal to or greater than 3 millimeters. The backlight unit 22 may further comprise a light coupler 38 coupled to the edge surface 36 or any other portion (e.g., edge portion of the first or second major surfaces) of the light guide plate 24. In some embodiments, the light coupler 38 may be coupled to the edge surface 36 with a refractive index-matching adhesive. Bonding with an index-matching adhesive can minimize or eliminate scattering due to machining-induced surface roughness.

Figure 7:
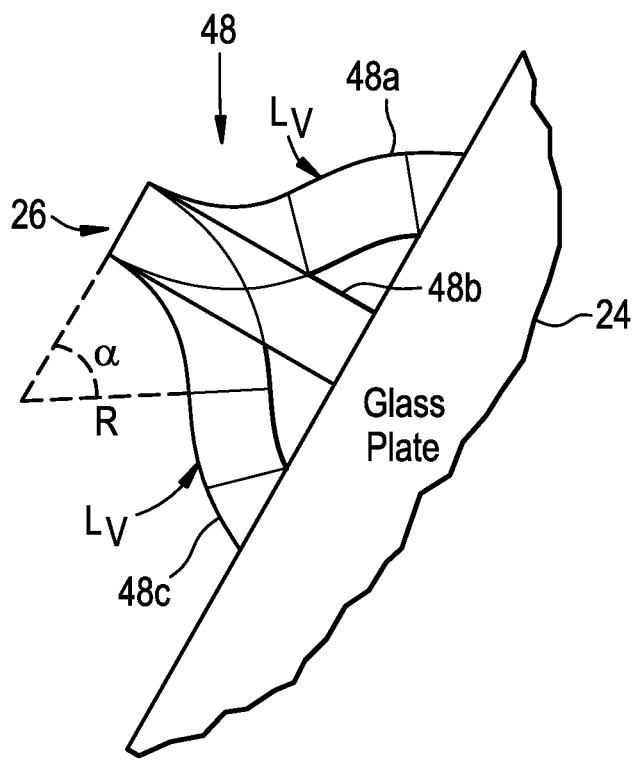
FIG. 7 is a top plan view of another embodiment of the present subject matter.
Figure 8:
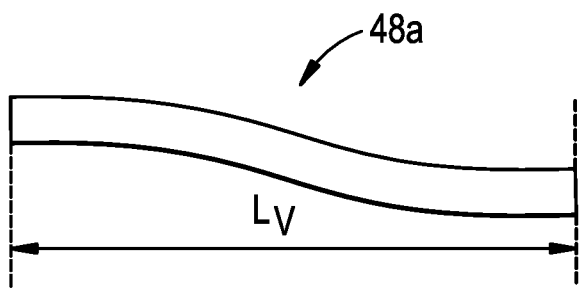
FIG. 8 is a side plan view of one waveguide of FIG. 7.
Figure 10:
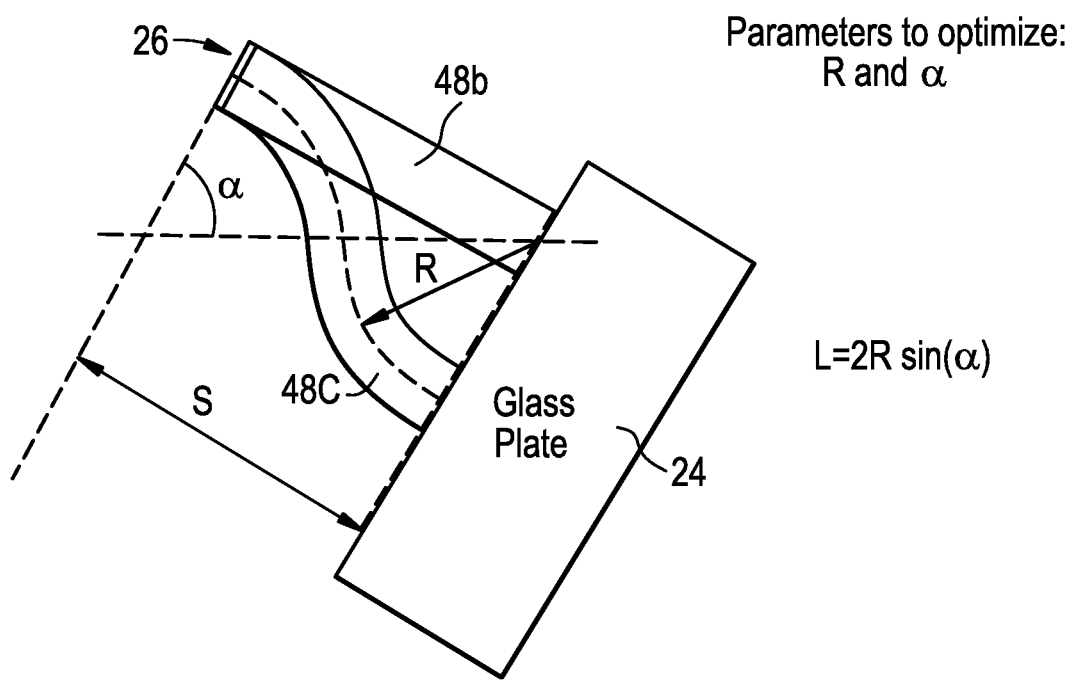
FIG. 10 is an illustration of the optimization of the embodiments depicted in FIGS. 7 and 8.

With continued reference to FIGS. 4 and 5, the exemplary light coupler 38 may in some embodiments comprise three waveguides 38a, 38b 38c. These waveguides may be straight and piecewise as depicted in FIGS. 4 and 5 or may be curvilinear as depicted in FIGS. 7, 8 and 10. In some embodiments, an exemplary light coupler 38 may comprise multiple layers of waveguides 38a, 38b, 38c which transform light from a suitable incident light source 26, e.g., LED or the devices depicted in FIGS. 3A-3C, having a predetermined input thickness $Th_2$ and length $L_2$, into separate and discrete output thicknesses $Th_2'$, $Th_2''$, $Th_2'''$ and/or lengths $L_2'$, $L_2''$, $L_2'''$. That is, an exemplary coupler 38 can transform the light input from a suitable light source 26 from different heights at an input side (e.g., an input facet of the coupler) to the same height at an output side (adjacent or bonded to the light guide plate edge) by shifting the waveguide cross-section in the horizontal direction followed by a shift in the vertical direction. Of course, the depiction of a coupler having three waveguides 38a, 38b, 38c should not limit the scope of the claims appended herewith as some embodiments can include only two waveguides (not shown), four waveguides (not shown) or five or more waveguides (not shown). Thus, the number of waveguide layers can a light source can be coupled into different waveguide layers in the horizontal or lateral directions, and the output of each layer can be coupled into a light guide plate 24 from a different portion of the coupling edge 36. In this way, an exemplary optical coupling device can enable efficient coupling of light from a thicker light source 26 to a thinner light guide plate 24. In some embodiments, the ratio of light source thickness to light guide plate thickness can be 1:1, 1.5:1, 2:1, 2.5:1, 3:1, 4:1, 5:1, greater than 1.5:1, and all subranges and ratios therebetween.

In some embodiments, to achieve a high coupling efficiency, the thickness of the input of the coupling device (or total thickness of all waveguides) may be equal to, or larger than, the height $Th_2$ of the light source. The thickness of the output of the coupling device $Th_2'$, $Th_2''$, $Th_2'''$, etc. (or each waveguide) may be substantially similar to the thickness $Th_1$ of the light guide plate 24 to be coupled. Of course, in some embodiments, $Th_2'$, $Th_2''$, $Th_2'''$ and any combination thereof can be smaller than $Th_1$. In additional embodiments, the input length $L_2$ the coupling device 38 should be equal to, or larger than, the length of the light source. The output length $L_2'$, $L_2''$, $L_2'''$ of each layer waveguide 38a, 38b, 38c can each be substantially similar to the input length $L_2$ but, of course, can be larger or smaller as required. The layer waveguides 38a, 38b, 38c may be separated by a predetermined distance $G_s$, may be adjacent one another, or may have varying distances between each other. Again, the number of waveguide layers can be any number from 2 to 20.

In some embodiments, an exemplary coupler 38 can be a two-step, piecewise-straight transition as depicted in FIGS. 4 and 5 where a first section S1 realizes a bend in the x-direction, and a second section $S_2$ provides a bend in the y-direction with a total coupler section $S=S_1+S_2$. A non-limiting example of such a couple is depicted in FIGS. 4 and 5 for a light source to light guide plate size ration of 3:1 having three waveguide layers: a central straight waveguide 38b and two piecewise-linear bend waveguides 38a, 38b on either side thereof. It should be noted that for any integer ratio of the light source to light guide plate size, the waveguide layers can each have the same thickness in some embodiments; however, it is envisioned that exemplary designs with a non-integer ratio can be readily accommodated by introducing a variation in the thickness of one or more waveguide layers.

Figure 6A:
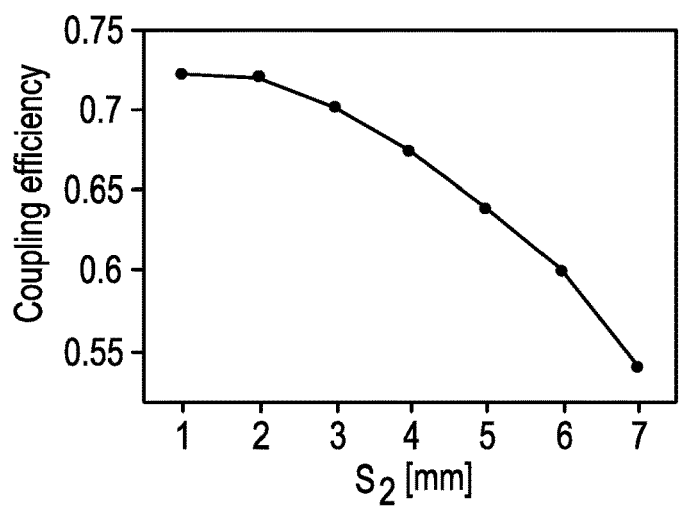
FIGS. 6A-6E are graphs of optical coupling efficiencies of some embodiments.
Figure 6B:
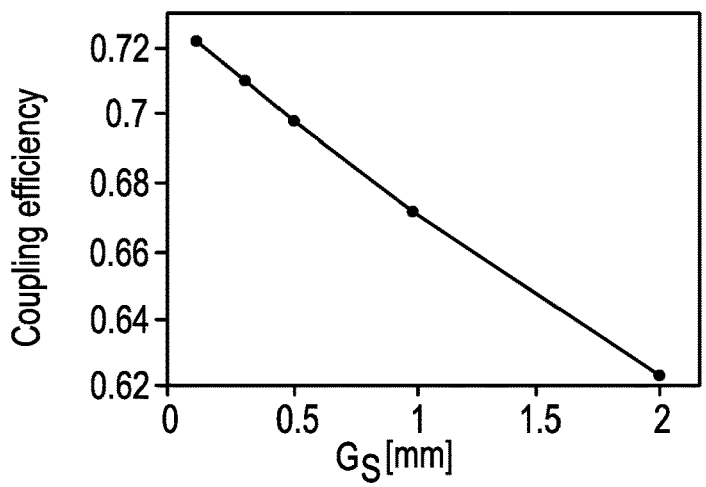
Figure 6C:
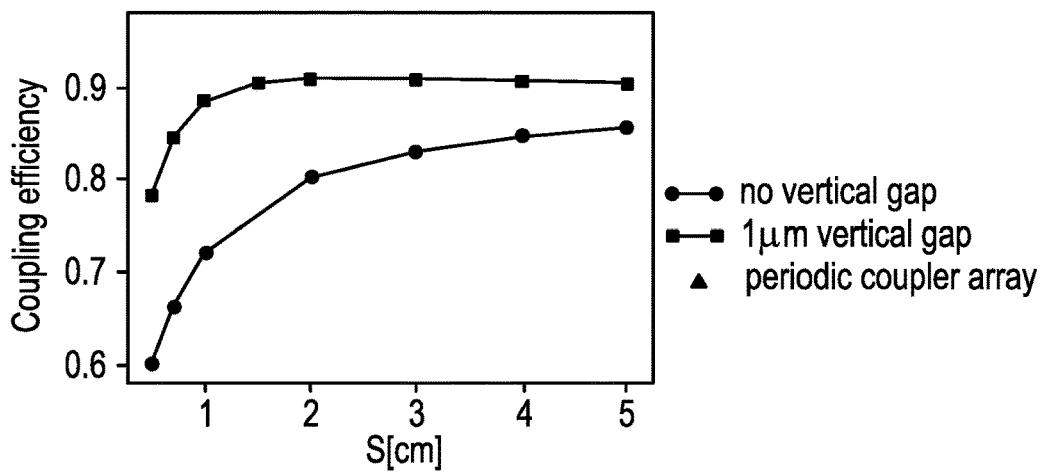
Figure 6D:
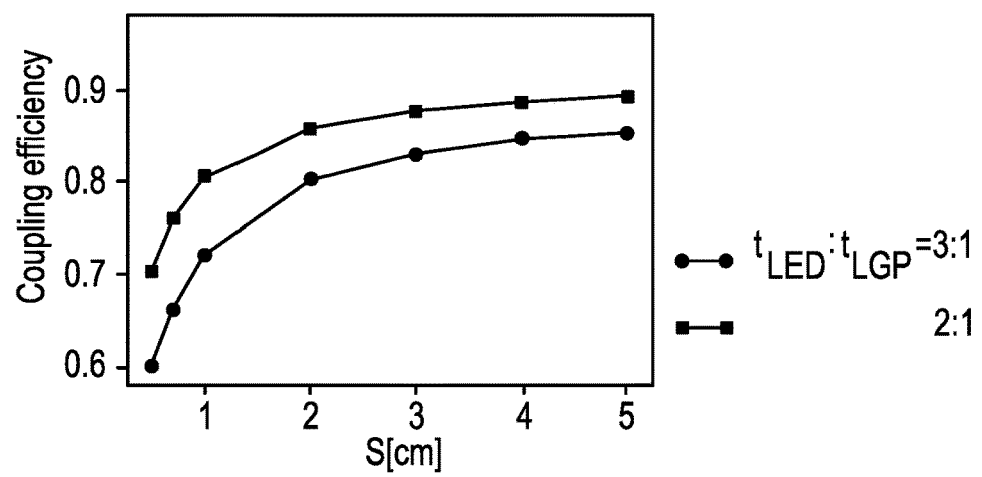
Figure 6E:
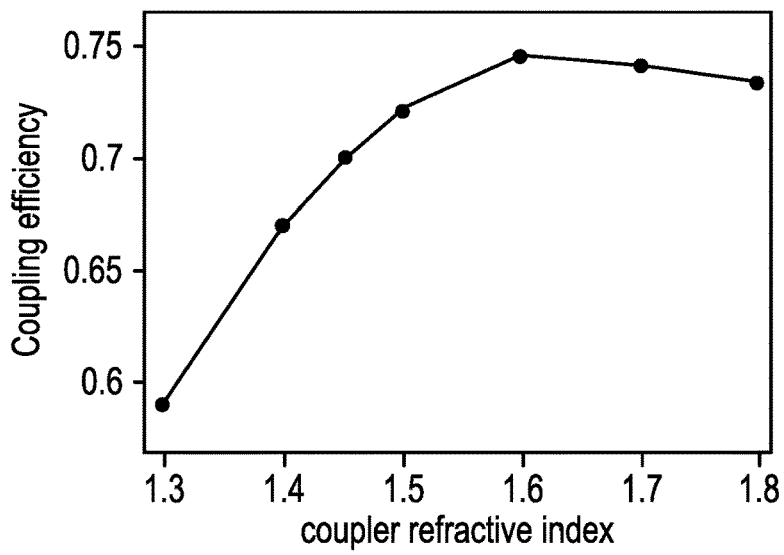

It has been discovered that the effective bends realized by the sections $S_1$, $S_2$ of the waveguides are the primary contributors to the optical loss of the coupler. Efficiency of the coupler as a function of the geometrical parameters was determined as depicted in FIGS. 6A-6E. FIGS. 6A-6E are graphs of optical coupling efficiencies of some embodiments. With the bend section of exemplary waveguides in the y-direction, $S_2$ was considered and the dependence of light coupling efficiency on the separation between the output cross-sections of exemplary waveguides, $G_s$, was also considered. FIGS. 6A and 6B graphically illustrate that a coupling efficiency above 70% can be obtained for an exemplary embodiment having S=10 mm and other nominal parameters as described above, for $S_2$ less than 3 mm and $G_s$ smaller than about 0.5 mm. The dependence of the coupling efficiency on the overall coupler length S is also illustrated in FIGS. 6C and 6D, for $S_2$ set to 1 mm and $G_s$=0.1 mm. The efficiency can be observed to decrease rapidly for shorter coupler lengths due to an increased effective bend loss in the first waveguide segment $S_1$. It was also discovered that separation of the waveguide layers by a small gap in the y-direction improves the coupling efficiency considerably (FIG. 6C) thereby achieving more than 75% efficiency for a 5 mm coupler length S and about 88% for a 10 mm coupler length S. It was further discovered that the coupling efficiency was higher for smaller ratios of light source to light guide plate size where a 2:1 nominal coupler (no gap between waveguide layers) has a 10% higher efficiency than a 3:1 coupler which achieved about 70% for a 5 mm coupler length. With reference to FIG. 6E, variation of coupler refractive index in the range from 1.3 to 1.8 shows that a coupling efficiency above 70% can be achieved for coupler index values larger than 1.45 within certain configurations, thus allowing a wide range for coupler material selection. Exemplary couplers can be formed from PMMA, polycarbonate, or other suitable polymeric materials. Exemplary couplers can also be formed from glass substrates and may comprise any glass known including, but are not limited to, aluminosilicate, alkali-aluminosilicate, borosilicate, alkali-borosilicate, aluminoborosilicate, alkali-aluminoborosilicate, and other suitable glasses. These couplers may, in various embodiments, be chemically strengthened and/or thermally tempered. Non-limiting examples of suitable commercially available glasses include EAGLE XG®, Lotus™, Iris™, Willow®, and Gorilla® glasses from Corning Incorporated, to name a few.

These discoveries were determined using a ray-tracing model to evaluate the light coupling efficiency of several coupler embodiments. The light source was modeled using a source with Lambertian angular distribution which is representative of a typical LED emission and the reflectivity of the light source surface was set to 60%, as measured experimentally. The refractive index of the light guide plate was fixed at a nominal value of 1.5 while the coupler index was varied in the 1.3-1.8 range. Light coupled to a light guide plate was detected at the edges of the glass plate opposite the coupler, thus ensuring that only section was used with a light guide plate thickness of 0.2 mm (i.e., LED-to-LGP size ratio of 3:1). The 0.2 mm LGP thickness was at the lower end of the LGP thickness range; however, the results are representative of other LGP thickness values with the same ratio of the LED-to-LGP size.

Figure 9:
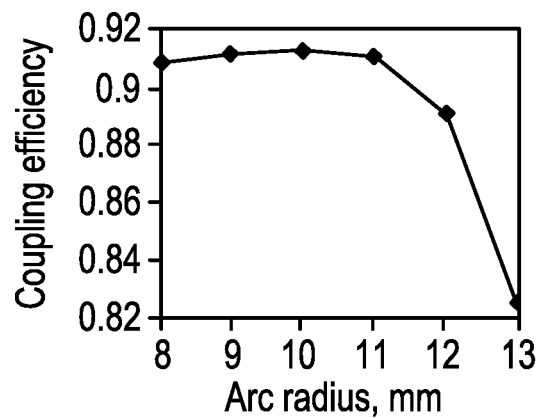
FIG. 9 is a graphical illustration of coupling efficiency versus arc radius.

As discussed above, additional embodiments can be curvilinear in shape. FIG. 7 is a top plan view of another embodiment of the present subject matter, and FIG. 8 is a side plan view of one waveguide of FIG. 7. With reference to FIGS. 7 and 8, an exemplary coupler 48 can include smooth, curvilinear waveguides 48a, 48b, 48c in both the vertical and horizontal dimensions. In this embodiment, the side waveguides 48a, 48c comprise two symmetric arcs characterized by an arc radius, R and arc angle α. In some embodiments, the output arc can be shorter that the input arc (can be terminated at an angle smaller than α). In additional embodiments, the input arcs can be flat whereas the output arcs can include non-flat portions of smooth shape to provide a vertical tilt Lv. The geometry of this vertical tilt Lv can be substantially similar to that depicted in the embodiments described above and with reference to FIGS. 4 and 5. FIG. 9 is a graphical depiction of coupling efficiency of the embodiment of FIGS. 7 and 8 in which the curved waveguides 48a, 48b, 48c are separated by a small air gap and for a case of equal length of the input and output arcs of the curved waveguide and a coupler length of 10 mm. It can be observed that a coupling efficiency of this embodiment was about 91%. Thus, an exemplary coupler 48 can transforms the light input from a suitable light source 26 from different heights at the input side to the same height at the output side by shifting the waveguide cross-section in the horizontal direction followed by a shift in the vertical direction. Of course, the depiction of a coupler having three waveguides 48a, 48b, 48c should not limit the scope of the claims appended herewith as some embodiments can include only two waveguides (not shown), four waveguides (not shown), or five or more waveguides (not shown). Therefore, the number of waveguide layers can be any number from 2 to 20 or more. Therefore, in exemplary embodiments, the emission of a light source can be coupled into different waveguide layers in the horizontal or lateral directions, and the output of each layer can be coupled into a light guide plate from a different portion of the coupling edge. In this way, an exemplary optical coupling device can enable efficient coupling of light from a thicker light source to a thinner light guide plate. In some embodiments, the ratio of light source thickness to light guide plate thickness can be 1:1, 1.5:1, 2:1, 2.5:1, 3:1, 4:1, 5:1, greater than 1.5:1, and all subranges and ratios therebetween. embodiments depicted in FIGS. 7 and 8, to achieve a high coupling efficiency, the thickness of the input of the coupling device (or total thickness of all waveguides) may be equal to, or larger than, the height $Th_2$ of the light source. The thickness of the output of the coupling device $Th_2'$, $Th_2''$, $Th_2'''$, etc. (or each waveguide) should be substantially similar to the thickness $Th_1$ of the light guide plate to be coupled. Of course, in some embodiments, $Th_2'$, $Th_2''$, $Th_2'''$ and any combination thereof can be smaller than $Th_1$. In additional embodiments, the input length L2 the coupling device 48 should be equal to, or larger than, the length of the light source. The output length $L_2'$, $L_2''$, $L_2'''$ of each layer waveguide 48a, 48b, 48c can each be substantially similar to the input length $L_2$ but, of course, can be larger or smaller as required. The layer waveguides 48a, 48b, 48c may be separated by a predetermined distance $G_s$, may be adjacent one another, or may have varying distances between each other. Again, the number of waveguide layers can be any number from 2 to 20.

FIG. 9 is a graphical illustration of coupling efficiency versus arc radius. With reference to FIG. 9, it can be observed that coupling efficiency increases as arc radius decreases with efficiencies greater than 90% achieved with arc radii less than about 11.5 mm to about 8 mm.

FIG. 10 is an illustration of an optimization of the embodiments depicted in FIGS. 7 and 8. With reference to FIG. 10, to achieve a higher coupling efficiency, the parameters to optimize include the input angle α and the output radius R where the length of the section S=2R sin(α). Table 1 provides a listing of radii and section lengths with an input angle α of 60 degrees. With reference to Table 1, coupling efficiencies of 64 to about 82 percent were achieved.

TABLE 1

| R | 4 mm | 5 mm | 6 mm |
|---|------|------|------|
| S | 6.9 mm | 8.7 mm | 10.4 mm |
| Coupling eff. | 64.0 | 75.1 | 81.7 |

The values provided in Table 1 above should not limit the scope of the claims appended herewith as it is envisioned that other input angles α can be provided to achieve different coupling efficiencies. For example, input angles less than 45 degrees are envisioned, input angles between 45-60 degrees are envisioned and input angles greater than 60 degrees are envisioned.

vertical tilts Lv. With reference to Tables 2A-2C, coupling efficiencies of over 90 percent were achieved.

TABLE 2A

Coupler length = 10 mm

| R (mm) | Efficiency | Lv (mm) |
|---|---|---|
| 8 | 0.891 | 4.69 |
| 9 | 0.898 | 4.11 |
| 10 | 0.902 | 3.52 |
| 11 | 0.906 | 2.85 |
| 12 | 0.907 | 2.01 |
| 13 | 0.908 | 0.00 |

TABLE 2B

Coupler length = 7.5 mm

| R (mm) | Efficiency | Lv (mm) |
|---|---|---|
| 5 | 0.782 | 3.43 |
| 6 | 0.834 | 2.54 |
| 7 | 0.861 | 1.47 |

TABLE 2C

Coupler length = 5 mm

| R (mm) | Efficiency | Lv (mm) |
|---|---|---|
| 2.5 | 0.341 | 4.71 |
| 3.0 | 0.586 | 1.70 |
| 3.5 | 0.599 | 0.73 |

The values provided in Tables 2A-2C above should not limit the scope of the claims appended herewith as it is envisioned that other coupler lengths, radii R and vertical tilts can be provided to achieve different coupling efficiencies.

Table 3 provides a listing of vertical shift, radii and transmission percentages. With reference to Table 3, coupling efficiencies of about 100 percent were achieved.

TABLE 3

| 1 | 0.725 | 91.0 |
|---|---|---|
| 2 | 2.600 | 95.6 |
| 3 | 5.725 | 99.6 |
| 4 | 10.01 | 100 |

The values provided in Table 3 above should not limit the scope of the claims appended herewith as it is envisioned that other radii R and vertical tilts can be provided to achieve different coupling efficiencies.

In some embodiments a backlight unit is provided comprising a glass light guide plate comprising a first major surface, a second major surface, and at least one edge surface having a thickness $Th_1$; a light coupler coupled to the light guide plate comprising an integer n number of waveguides bonded to portions of the edge surface; and a light source positioned adjacent an input facet of the light coupler, the input facet having a thickness $Th_2$. In other embodiments, $Th_2$ divided by $Th_1$ defines a ratio of 1.5:1, 2:1, 3:1, 4:1, 5:1, between 1.5:1 to 3:1, between 1.5:1 to 5:1, or greater than 5:1. In some embodiments, n is an odd or even integer and may also be can be between 2 and 20. In other embodiments, one of the n waveguides includes a curvilinear portion. In some embodiments, one of the n waveguides includes a straight portion. In other embodiments, one of the n waveguides includes a portion configured to change height and/or width. In some embodiments, $Th_1$ is between 0.1 mm and 3 mm. In other embodiments, each of the n waveguides has a thickness $Th_n$, and wherein $Th_1=Th_n$ and $Th_2>Th_n$. In some embodiments, the light coupler is comprised of a polymer or glass material. In other embodiments, a display device is provided comprising a liquid crystal display panel and the backlight unit described above.

In some embodiments, a backlight unit is provided comprising a glass light guide plate comprising a first major surface, a second major surface, and at least one edge surface having a thickness $Th_1$; a light coupler having an input facet coupled to the light guide plate comprising an integer n number of waveguides bonded to portions of the edge surface, each waveguide having an output facet; and a light source positioned adjacent the input facet of the light coupler, the input facet having a thickness $Th_2$. In other embodiments, $Th_2$ divided by $Th_1$ defines a ratio of 1.5:1, 2:1, 3:1, 4:1, 5:1, between 1.5:1 to 3:1, between 1.5:1 to 5:1, or greater than 5:1. In some embodiments, n is an odd or even integer. In other embodiments, n is between 2 and 20. In other embodiments, one of the n waveguides straight portion. In other embodiments, one of the n waveguides includes a portion configured to change height from the input facet to the output facet of the respective waveguide. In some embodiments, $Th_1$ is between 0.1 mm and 3 mm. In other embodiments, each of the n waveguides has a thickness $Th_n$, and wherein $Th_1=Th_n$ and $Th_n>Th_n$. In some embodiments, each of the n waveguides is adjacent to a different portion of the input facet. In other embodiments, a centerline of each of the output facets of the n waveguides is on the same plane. In other embodiments, a display device is provided comprising a liquid crystal display panel and the backlight unit described above.

In some embodiments, a light coupler is provided comprising an input facet; and an integer n number of waveguides, each waveguide having an output facet. In some embodiments, n is an odd or even integer. In other embodiments, n is between 2 and 20. In other embodiments, one of the n waveguides includes a curvilinear portion. In some embodiments, one of the n waveguides includes a straight portion. In other embodiments, one of the n waveguides includes a portion configured to change height from the input facet to the output facet of the respective waveguide.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "at least one seal" includes examples having two or more such seals unless the context clearly indicates otherwise. Similarly, a "plurality" or an "array" is intended to denote two or more, such that an "array of cavities" or a "plurality of cavities" denotes two or more such cavities.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

intended to note that a described feature is equal or approximately equal to a value or description. For example, a "substantially planar" surface is intended to denote a surface that is planar or approximately planar. Moreover, "substantially similar" is intended to denote that two values are equal or approximately equal.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A backlight unit comprising:
a glass light guide plate comprising a first major surface, a second major surface, and at least one edge surface having a thickness $Th_1$;
a light coupler having an input facet coupled to the light guide plate comprising an integer n number of waveguides bonded to portions of the edge surface, each waveguide having an output facet; and
a light source positioned adjacent the input facet of the light coupler, the input facet having a thickness $Th_2$;
wherein one of the n waveguides includes a straight portion positioned between the input facet of the light coupler and the at least one edge surface of the glass light guide plate, and
wherein the straight portion of said one of the n waveguides extends from the input facet of the light coupler to the at least one edge surface of the glass light guide plate.

2. The backlight unit according to claim 1, wherein $Th_2$ divided by $Th_1$ defines a ratio of 1.5:1, 2:1, 3:1, 4:1, 5:1, between 1.5:1 to 3:1, between 1.5:1 to 5:1, or greater than 5:1.

3. The backlight unit according to claim 1, wherein n is an odd integer.

4. The backlight unit according to claim 1, wherein n is between 2 and 20.

5. The backlight unit according to claim 1, wherein one of the n waveguides includes a curvilinear portion.

6. The backlight unit according to claim 1, wherein one of the n waveguides includes a portion configured to change height from the input facet to the output facet of the respective waveguide.

7. The backlight unit according to claim 1, wherein $Th_1$ is between 0.1 mm and 3 mm.

8. The backlight unit according to claim 1, wherein each of the n waveguides has a thickness $Th_n$, and wherein $Th_1=Th_n$ and $Th_2>Th_n$.

9. The backlight unit according to claim 1, wherein each of the n waveguides is adjacent to a different portion of the input facet.

10. The backlight unit according to claim 2, wherein a centerline of each of the output facets of the n waveguides is on the same plane.

11. A display device comprising a liquid crystal display panel and the backlight unit of claim 1 configured to illuminate the liquid crystal display panel.

12. A light coupler comprising:
an input facet; and
an integer n number of waveguides, each waveguide having an output facet, at least one of the n number of waveguides including a curvilinear portion between the input facet and the respective output facet, the curvilinear portion having an arc radius between 11.5 mm to 8 mm,
wherein the at least one waveguide of the n number of waveguides including the curvilinear portion achieves a coupling efficiency of at least 90%.

13. The light coupler according to claim 12, wherein n is an odd integer.

14. The light coupler according to claim 12, wherein n is between 2 and 20.

15. The light coupler according to claim 12, wherein one of the n waveguides includes a straight portion.

16. The light coupler according to claim 12, wherein one of the n waveguides includes a portion configured to change height from the input facet to the output facet of the respective waveguide.

17. The light coupler according to claim 12, wherein the second arc is shorter than the first arc.

18. A light coupler comprising:
an input facet; and
an integer n number of waveguides, each waveguide having an output facet, at least one of the n number of waveguides including a curvilinear portion between the input facet and the respective output facet, the curvilinear portion having an arc radius between 11.5 mm to 8 mm,
wherein the curvilinear portion of said at least one of the n number of waveguides comprises a first arc and a second arc, and
wherein the first arc is a flat arc and the second arc is a non-flat arc.

* * * * *